United States Patent [19]

Johnson

[11] Patent Number: 4,720,204
[45] Date of Patent: Jan. 19, 1988

[54] BANNER ARM BREAK-AWAY DEVICE

[75] Inventor: Dale L. Johnson, Glencoe, Minn.

[73] Assignee: Sterner Lighting Systems Incorporated, Winsted, Minn.

[21] Appl. No.: 922,206

[22] Filed: Oct. 23, 1986

[51] Int. Cl.⁴ ............................................. F16D 1/00
[52] U.S. Cl. ........................................ 403/24; 403/2; 285/2; 40/607
[58] Field of Search ................... 403/2, 11, 24; 285/2, 285/3, 4; 52/98, 99; 40/607, 608

[56] References Cited

U.S. PATENT DOCUMENTS

| | | | |
|---|---|---|---|
| 1,839,690 | 1/1932 | Malinowski | 285/2 |
| 2,376,279 | 5/1945 | Schlenkert | 72/118 |
| 3,349,531 | 10/1967 | Watson | 52/296 |
| 3,499,630 | 3/1970 | Dashio | 256/13.1 |
| 3,521,413 | 7/1970 | Scott et al. | 52/98 |
| 3,551,012 | 12/1970 | Sutliff et al. | 403/11 |
| 3,951,556 | 4/1976 | Strizki | 403/2 |
| 4,007,564 | 2/1977 | Chisholm | 52/98 |
| 4,302,799 | 11/1981 | Behrens | 362/226 |
| 4,346,666 | 8/1982 | Iso | 40/607 X |

Primary Examiner—Andrew V. Kundrat
Attorney, Agent, or Firm—Kinney & Lange

[57] ABSTRACT

A banner support arm safety coupling rigidly mounts banner support arms to a pole and has a frangible or breakable portion so the coupling will break under loads on the banner before the pole fails. A safety line holds the coupling portion from completely separating after the frangible portion breaks.

10 Claims, 3 Drawing Figures

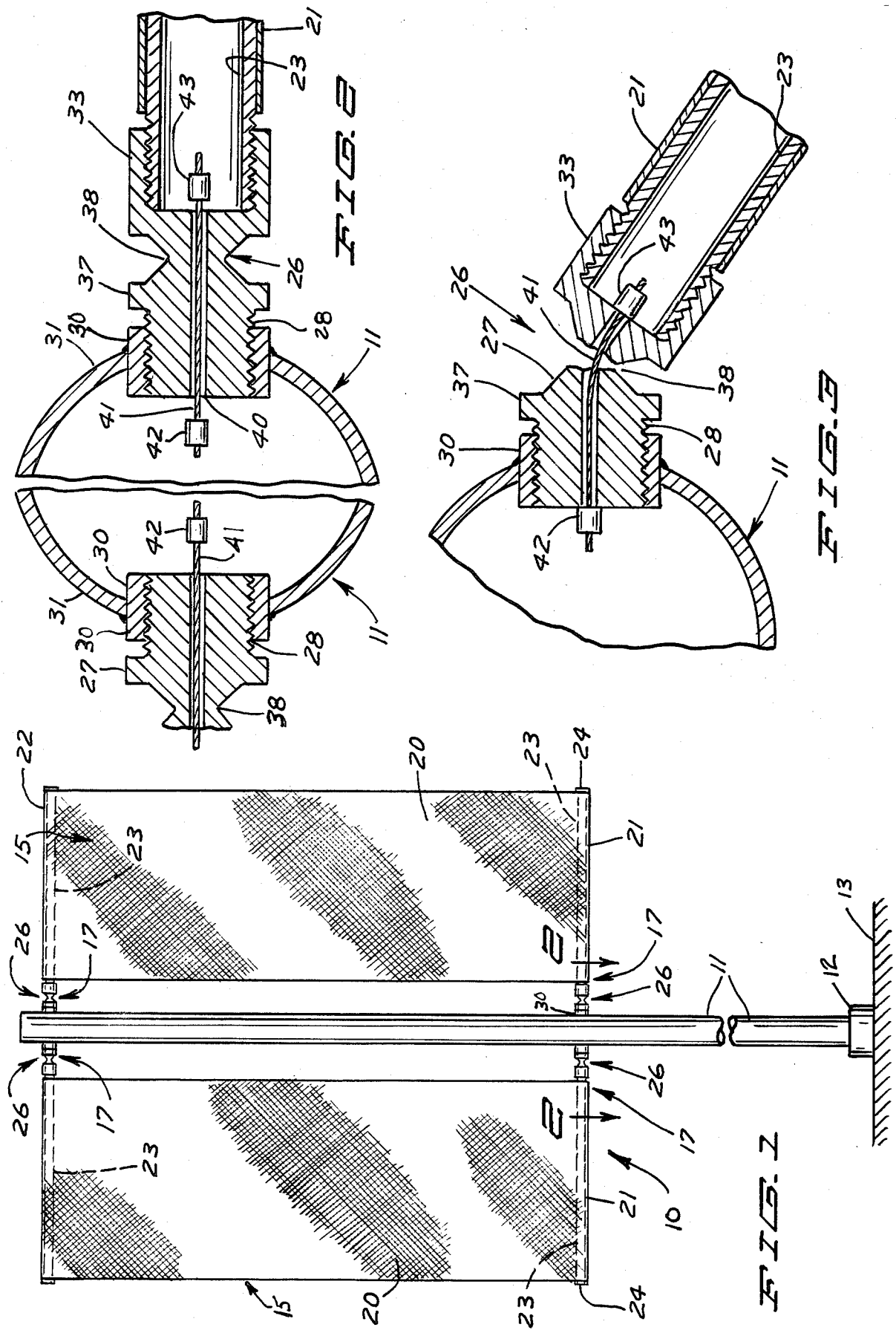

BANNER ARM BREAK-AWAY DEVICE

BACKGROUND OF THE INVENTION

1. Field of the Invention.

The present invention relates to safety break-away devices for banner support arms which are used for supporting large decorative banners and which have safety mounting couplings which break-away under high wind loading to prevent damage to the supporting pole and also to continue to support the banner to keep it from falling and causing injury or damage.

2. Description of the Prior Art.

In the prior art, various break-away devices have been used, particularly for bases supporting poles or standards, wherein when an excessive load strikes a pole or more usually when a car will hit the pole, the base will break-away and minimize damage to the automobile or the occupants, but will, of course, many times completely destroy the pole as it falls. A device such as that is shown in U.S. Pat. No. 3,951,556, which has coupling members for the support bolts that have reduced diameter break-away sections. These bolts are at the base of the pole and when broken, the entire pole will topple.

Similar break-away bolts are shown in U.S. Pat. No. 3,521,413 where, again, the bolts are positioned at the base of the large light standard or pole and when broken will permit the standard to fall.

A safety rail break-away post is shown in U.S. Pat. No. 3,499,630, and here again the break-away device is adjacent to the ground and all of the supported structure can tip over or topple when the break-away device fails. A connector of the same general type is shown in U.S. Pat. No. 3,349,531, and is envisioned for use in parking signs, parking meters and street name markers. The break-away connections are primarily for providing a release when the post is struck by an automobile.

A ceiling hanger that has reduced sections on a support rod so that the support rod length can be adjusted relatively easily is shown in U.S. Pat. No. 2,376,279.

Another patent which shows a break-away coupling, again for the base of a light pole or standard, but of slightly different construction which permits the mounting bolts to break out sections of threaded supporting sleeves that receive the bolts is shown in U.S. Pat. No. 4,007,564. These safety devices also are at the base of a pole or standard so that the roadway pole will fall when it is struck by an automobile.

Large banners are widely used by municipalities and shopping centers by shopping area merchants and others in order to advertise the area, attract shoppers, welcome visitors, or simply as decorative devices. The large cloth banners provide a substantial wind load stress on the supporting poles, and during gusts of high winds the added wind load stress can prove to be several times greater than the normal stress on the support pole, and such loads can cause the pole to fail at the base and crash to the ground. Limited success at preventing damage has been achieved by providing large holes in the banner so that the air can spill through the holes. While partially effective, the holes spoil the appearance of the banner. Some banners are made with a rigid supporting arm at the top with one or more small ropes that are attached loosely to a loose bottom arm. This arrangement allows the banner to flap in the breeze to spill off the excess air. The idea is that the ropes could be cut and released in the event of a sudden high wind, to save the poles from being destroyed. The arrangement is not very successful, and the constant flapping of the banner makes it annoying and destroys its aesthetic appeal.

SUMMARY OF THE INVENTION

The present invention relates to a banner support assembly which holds the banner securely by rigid horizontal arms positioned at the top and bottom of each banner, and which extend laterally from a main support such as a pole. The banners have hems that receive the support arms, and the arms simply slide through the hems. A support disc at the outer end of each arm is provided so the banners will not slip off the arm. These discs can be threaded onto the support arms or welded in place. The inner ends of the rigid arms are coupled to the support through break-away couplings that are designed to break under a predetermined load on the banner, and are specifically designed to fail before the support fails. The break-away (or frangible) section of the couplings is machined from a single piece of material, such as metal or plastic. The sections are threaded into support nipples on the pole on one end, and have the banner arms threaded on at the other end of the section. A safety cable or chain is passed through the center of the break-away section and spans the section that will fracture, so that if the break-away coupling fails, the arm will remain supported through the cable on the pole so that the support arm and banner will not fall and cause injury.

The banner break-away coupling is joined to the pole using left hand pipe threads so that a workman cannot simply substitute a standard piece of pipe for the break-away section, or thread in the banner arm directly into the support nipple on the pole to thereby ensure that the safety break-away section will have to be replaced with a similar device when it fails. This will ensure that the safety features cannot be eliminated. The banner can be held taut because the break-away sections are rigid, so that the graphics on the banner can easily be seen to provide its intended attractive appearances. The banner will not flap or wrinkle, and yet the breakaway section will provide protection so the supporting poles will not break and cause injury to people or property in the vicinity when sudden wind loads are encountered.

BRIEF DESCRIPTION OF THE DRAWINGS

FIG. 1 is a front elevational view of a typical pole supporting banners using break-away devices made according to the present invention;

FIG. 2 is an enlarged view of a break-away device made according to the present invention with parts in section and parts broken away; and FIG. 3 is a view showing a break-away device after it has failed and with a safety cable supporting the device.

DETAILED DESCRIPTION OF THE PREFERRED EMBODIMENTS

A banner assembly indicated generally at 10 is shown as comprising a pole or standard 11, supported on a suitable base 12 of any desired construction so that it is fixed on a supporting surface 13 and stands upright. The poles generally are steel or aluminum, relatively expensive, and fairly rigid. For the display of decorative banners indicated generally at 15 top and bottom support assemblies indicated generally at 17 are used on each side of the pole (more can be used, if desired). In the form shown, the banners have a main panel 20, and hems 21 and 22 at the lower and upper ends, respectively. These hems form elongated tubular pockets into which banner support arms 23 are mounted. The banner support arms are pipes, and larger washers 24 are positioned at the outer ends to keep the hems from easily sliding off the banner arms. The arms are threaded at the inner ends with standard right hand threads so that they will thread into the outer end of a break-away coupling section indicated generally at 26. Each of the break-away coupling sections comprises a base member 27 that has an outer left hand thread shown at 28, which threads into a sleeve or coupling nipple 30 (with left hand threads) that is welded or otherwise suitably fixed into the wall 31 of the pole 11. The couplings 30 are positioned at desired heights, and are rigidly attached to the pole.

The break-away section 26 further includes an outer break-away portion 33 that has right hand threads which receive the threaded end of the support arm 23, so that the support arm 23 is securely fastened in place. The base end 27 generally has a hex-shaped outer flange so that the break-away section can be tightly threaded into the coupling nipple 30.

The break-away section 26 has a reduced diameter portion indicated at 38 between the outer section 33 and the base section 27, and this reduced diameter section is made in a generally v-shaped annular groove as shown so that the diameter comprises a frangible (breakable) section that will fail under high loads before the arm 23 bends and also before the pole 11 fails. This diameter can be varied to obtain the desired strength, depending on the material of construction and the size of the load to be supported. It forms a frangible portion between the break-away portion 33 and the base member 27 of the break-away section 26.

Additionally, a central bore 40 is provided through the break-away section 26, and a safety cable or line (it can be a chain, steel cable, or suitable other material) indicated at 41 is passed through this bore 40. Stop lugs 42 and 43 are fixed at opposite ends of the cable 41 and are selected to be of size so that the lugs will not pass through the bore 40. The lug 43 is positioned inside the banner support arm 23, and the lug 42 will be positioned on the interior of the pole 11 when the break-away section 26 is threaded into place. The safety line 41 is actually longer than the bore 40, so that there is some play, but is not excessively long.

When the banners are assembled as shown in FIG. 1, there is a safety break-away section 26 at the base of each of the arms, at the upper and lower edges of both of the banners. The arms 23 can be positioned so that the banners 20 are held taut, so that any graphics on the banners can easily be read and the banners will remain unwrinkled. Under normal wind loading, the banners 15 are sufficiently taut so that they will not flap or "snap" in the breeze, and the panels in the banners can be continuous, that is, there does not have to be any wind pressure relief holes in the banners. However, under high wind loads, the break-away section 26 will limit the amount of load that can be transferred to the pole or support (such as a building wall), and will break at the frangible portion 38 if sudden gusts exceed allowable limits. The breakage is controlled, of course, to be in the frangible section or reduced diameter section 38, and of importance is the fact that if the outer portion 33 completely separates from the base portion 27, the safety line 41 will retain the portion 33 and the supported arm 23 with respect to the pole. The wind pressure will be relieved because the arm can swing or move to permit the wind to spill from the banner. The arm 23, however, will not fall, nor will the banner drop, even if both of the safety break-away sections supporting the banner are broken at the same time. In this way, the safety break-away sections provide protection for the main support poles so that the main structural support is not damaged, and will not fall, but yet controlled breakage can occur prior to ripping the banners or causing any substantial damage.

The threaded end 28 is made with a left hand pipe thread, which is not a standard thread that is available at conventional hardware stores, so that the banner arm 23 cannot be directly threaded into the nipple 30, which also has left hand threads. This way the safety break-away sections have to be replaced so that the safety features of the banner pole will not be easily bypassed. When repair is necessary, a new break-away section 26 will be used.

The break-away sections can be made out of aluminum, for example, or out of suitable plastics or other materials. The cost is low, and except for the socket 30 and the coupling itself, all the other parts for supporting the banner are standard.

Again, the safety line 41 can be either a chain or a cable, or a strong nylon line if one is available. The line is made so that it will permit only a limited amount of movement between the separated portions of the safety section.

Although the present invention has been described with reference to preferred embodiments, workers skilled in the art will recognize that changes may be made in form and detail without departing from the spirit and scope of the invention.

What is claimed is:

1. A safety coupling for connecting a support arm with respect to a main support member, wherein the support arm may be subjected to sudden loads, including a coupling section having a first portion and a second portion, means to rigidly mount said first portion with respect to said main support, means to rigidly mount a support arm on the second portion, a reduced strength frangible portion formed on the coupling section between said first and second portions of said coupling section, and flexible connecting means for connecting the first portion to the second portion when the frangible portion has fractured, the connecting means having sufficient flexibility to allow, under ambient load, unconstrained limited freedom of movement in all directions of the first portion with respect to the second portion after the frangible portion has fractured.

2. The safety coupling of claim 1, and a safety line joining the first and second portions of said coupling section and spanning the frangible portion.

3. The coupling of claim 1, wherein said coupling has a central bore extending through said frangible portion and spanning into the first and second portions, and a safety line mounted in said bore, said safety line being provided with means at opposite ends that prevent the line from passing through said bore when installed, said safety line permitting limited movement between the first and second portions when the frangible portion has fractured.

4. A safety coupling for connecting a support arm with respect to a main support member, wherein the support arm may be subjected to sudden loads, including a coupling section having a first portion and a second portion, means to rigidly mount said first portion with respect to said main support, member means to rigidly mount a support arm on the second portion, a reduced strength frangible portion formed on the coupling section between said first and second portions of said coupling section, said support arm comprising a pipe having a pipe thread, the second portion of the coupling having a conventional pipe thread for receiving a threaded end of said support arm, a non-conventional thread formed on the second portion of said coupling section, and a mating thread formed on the means to mount the coupling section with respect to said main support member whereby replacement of said coupling section requires the non-standard thread for attachment.

5. A banner support assembly comprising a pole for supporting a banner, first and second banner support arms spaced apart in direction along the longitudinal axis of said pole, each of said support arms having means for mounting the arm to extend laterally from said pole comprising:
  a coupling member for each of said arms having first and second portions; said first portion being rigidly mounted to said pole, said second portion being mounted to said respective support arm; and
  a rigid frangible portion mounting said respective first and second portions together and being selected in strength to fracture under loads on a banner supported on said support arm prior to failure of the supporting pole.

6. The apparatus as specified in claim 5 wherein said first and second portions have a safety line extending therebetween to permit only limited movement of said first and second sections relative to each other after said frangible portion has fractured.

7. The apparatus as specified in claim 5 wherein said first portion is joined to said pole utilizing a non-standard threaded coupling assembly.

8. The apparatus as specified in claim 5 wherein said first and second portions each comprise threaded means for supporting the respective section relative to the pole and to the support arm, respectively.

9. The apparatus as specified in claim 5 wherein each coupling member has a central bore extending through both the first and second portions and extending across the frangible portion, and a safety line extending through said bore and spanning said frangible portion, said safety line having means at opposite ends thereof to prevent the first and second portions from separating relative to each other more than a desired amount.

10. A banner support assembly for attaching to a pole for supporting a banner subjected to wind loads comprising, first and second banner support arms for attaching to a pole location spaced apart in direction along the longitudinal axis of such pole, each of said support arms having means for mounting the arm to extend laterally from such pole comprising:
  a coupling member for each of said arms having first and second portions; said first portion having means for rigidly mounted to the respective location of such pole, and said second portion being mounted to said support arm respectfully; and
  a rigid frangible portion mounting said respective first and second portions together and being selected in strength to fracture under loads on a banner supported on said support arms prior to failure of a supporting pole on which both arms are mounted.

* * * * *